United States Patent [19]

Rosaz

[11] 3,903,915

[45] Sept. 9, 1975

[54] VALVE ASSEMBLY
[75] Inventor: Guy F. Rosaz, Pontarlier, France
[73] Assignee: Scovill Manufacturing Company, Waterbury, Conn.
[22] Filed: Feb. 7, 1974
[21] Appl. No.: 440,534

[52] U.S. Cl. ................................. 137/232; 150/9
[51] Int. Cl. ............................................ F16k 15/20
[58] Field of Search ............ 137/232; 138/89, 89.3; 46/90; 150/8, 9

[56] References Cited
UNITED STATES PATENTS

| | | | |
|---|---|---|---|
| 2,679,857 | 6/1954 | Russell | 137/232 |
| 2,736,333 | 2/1956 | Hancox | 137/232 |
| 2,777,490 | 1/1957 | Munk | 150/8 |

Primary Examiner—Harold W. Weakley
Attorney, Agent, or Firm—Robert E. Burns; Emmanuel J. Lobato; Bruce L. Adams

[57] ABSTRACT

A valve assembly for an inflatable envelope comprises a valve body having an enlarged head and an externally screw threaded shank with a through bore. A nut threadably engaged on the shank grips the wall of the envelope between the nut and said head, with a sealing elastic eyelet disposed between said head and said wall. A valve-carrying sleeve is screw-threaded with play within the bore of the valve body, with a sealing joint disposed between the sleeve and the valve body, and a valve-forming resilient washer mounted within the sleeve and stressed against a seating on the sleeve. The sleeve and nut are covered by a stopper including a resiliently deformable central stud sealably press-fitted in the sleeve and a peripheral part fitted about the nut.

11 Claims, 5 Drawing Figures

VALVE ASSEMBLY

The invention relates valves for inflatable envelopes and the like.

Currently known impervious fabrics enable the provision, by sticking or by welding, or large-dimension inflatable envelopes, for example inflatable structures protecting large volumes, and pneumatic boats and life-saving devices which employ valve assemblies incorporating an operculum or flexible washer.

The problems involved with these valves basically concern the fitting on the wall of the envelope; the efficiency of the fluid-tightness at variable pressures, for example as a function of temperature according to the medium in which the envelope is placed and the influence of solar rays; easy mounting and dismantling; resistance to sea water; and production at an acceptable manufacturing cost.

The various known models of valves have all or some of the following drawbacks.

Fluid-tightness of the joint on the fabric is obtained both by placing a reinforced fabric or grommet about the passageway for the valve body and by cooperating grooves and ribs on the foot of the body and on a gripping washer, but these securing means do not enable the avoidance of leaks along the strengthening fibres of the reinforced fabric produced by tautening upon inflation. Also, the stiffness resulting from a reinforcing grommet prevents mounting of the valve from outside the envelope since the head of the valve body, which is necessarily larger than the substantially inextensible grommet hole cannot be introduced through the grommet without damage thereto; consequently, a valve damaged by sand or ripped off for any other reason cannot be replaced without difficulties, for example opening the envelope and then sticking it together again.

The head or foot of currently used screw-fitted valves generally include notches, flats or grooves enabling use of a spanner for the mounting operation, but such tools can only be used from inside for the initial mounting of the valve before closure of the envelope.

Fluid-tighness of known valves is poor at low pressures, since the flat operculum or washer is not strongly applied against its seat in the absence of a high internal pressure. Most valves thus include a complementary stopper adapted to compensate the loss of efficiency of the clapper, but the overall dimensions often create a large protuberance on the side of a pneumatic boat, for example, and this inevitably leads the user to employ the valve as a handle. The ripping forces exerted on the valve-fabric joint are large and can cause leaks or even ripping off of the valve. Moreover, known stoppers are usually screwed on and involve the drawbacks of a screw thread during use in sand or in mud.

An aim of the invention is to provide a valve assembly which avoids or reduces the mentioned drawbacks.

According to the invention, a valve assembly for inflatable envelopes and the like comprises a valve body having an enlarged head and an externally screw threaded shank with a through bore. A nut threadably engaged on the shank is adapted to grip the wall of an envelope between the nut and the head of the valve body with a sealing elastic eyelet disposed between the head of the valve body and said wall. A valve-carrying sleeve mounted within the bore of the valve body, with a sealing joint disposed between the sleeve and the valve body, carries a valve-forming resilient washer mounted within the sleeve and stressed against a seating on the sleeve. The sleeve and nut are covered by a stopper including a resiliently deformable central stud sealably press-fitted in the sleeve and a peripheral part fitted about the nut.

An embodiment of the invention will now be described, by way of example, with reference to the accompanying drawings, in which.

Figure 1:
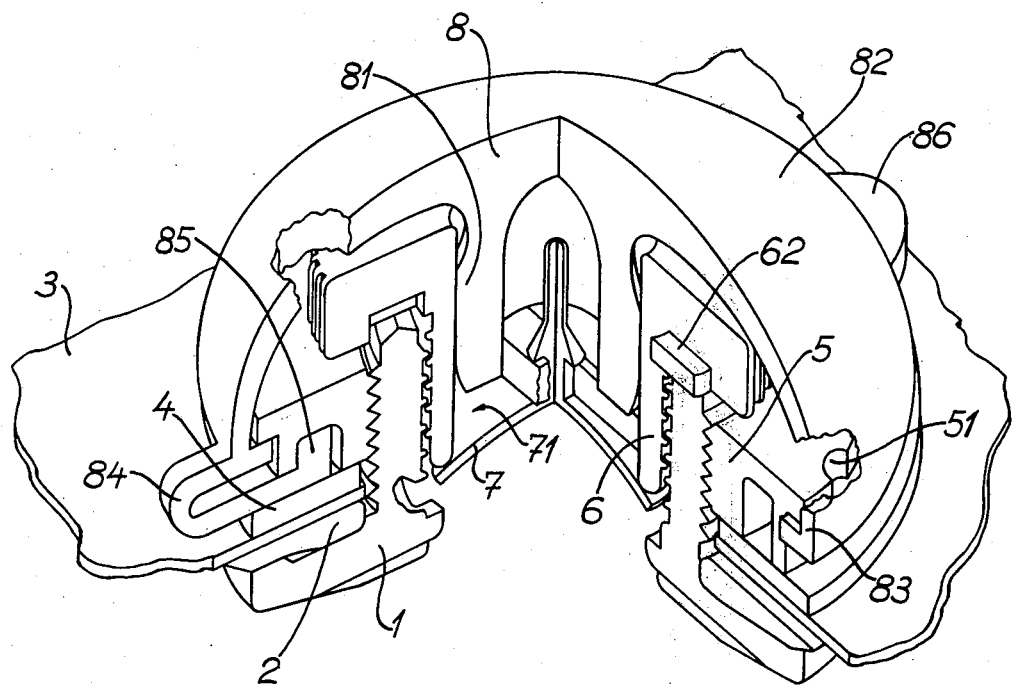
FIG. 1 is a cut-away view of a valve assembly.

FIG. 1 shows a valve assembly including a valve body 1, a sealing eyelet 2 gripped between the body 1 and a fabric 3 forming a wall of an inflatable envelope by a nut 5 and a washer 4 facilitating rotation of the nut and improvement of gripping, a sleeve 6 screwed in the inner bore of body 1 and carrying an operculum or flexible washer 7, and a stopper 8 the cap of which covers the part of the assembly situated at the exterior of the envelope.

Figure 2:
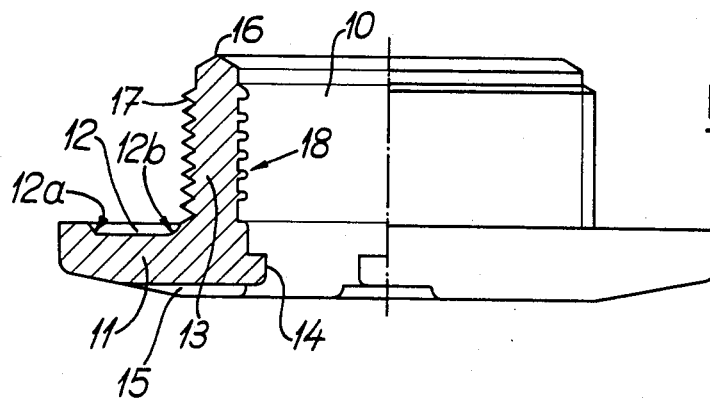
FIG. 2 is a side elevation partially in axial cross-section of the valve body.

FIG. 2 shows in detail the valve body 1 comprising a cylindrical wall 13 with a central cylindrical bore 10, and having a circular head or flange 11 which is situated inside the inflatable envelope. The flange 11 includes on its face applied against fabric 3 an annular groove 12 with a bevelled outer edge 12a inclined at about 45° and a rounded inner edge 12b. On the opposite face of flange 11 are provided a plurality of diametrally opposed grooves 15 extending from bore 10 to towards the periphery of the flange do as to prevent the fabric of an opposite wall of the envelope from blocking the bore 10 during deflation. Inside the part of bore 10 by flange 11 are provided a plurality of gripping protuberances 14 adapted to cooperate with a spanner inserted through bore 10 from outside the envelope for mounting or removal of the valve assembly. At its end opposite to flange 11, wall 13 has a V-shaped bevelled end providing a protruding angular edge 16 intended to ensure fluid-tightness between the valve body 1 and sleeve 6 by means of a flexible annular sealing joint 62.

The sleeve 13 is externally tapped with contiguous machined threads 17 having a triangular profile to permit a precise tightening of nut 5. The inner threading 18 in which the sleeve 6 is screwed has well spaced-apart threads providing a fairly large axial play so that sand or any other material does not prevent it from being used. These threads have a round (as shown) or a square or trapezoidal section.

Figure 3:
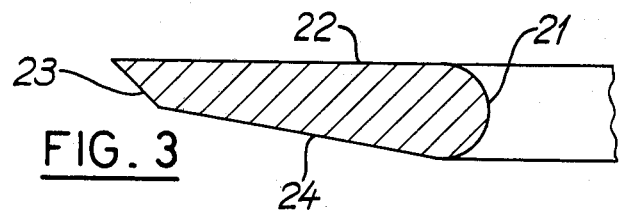
FIG. 3 is a partial cross-section on an enlarged scale of the sealing eyelet.

FIG. 3 shows the sectional shape of the sealing eyelet 2 which has an inner toric edge 21 which when undeformed has a lesser diameter than the outer diameter of wall 13 and therefore comes to elastically apply against the wall 13. The face 22 which is applied against fabric 3 is planar, while the face 24 which is inserted in groove 12 tapers gradually towards the outer periphery so that upon tightening of the nut 5 on the valve body, the pressure exerted by washer 4 squashes the eyelet 2 and increases the radial pressure on the wall 13 in the region of the toric edge 21. The outer edge 23 is bevelled.

Figure 4:
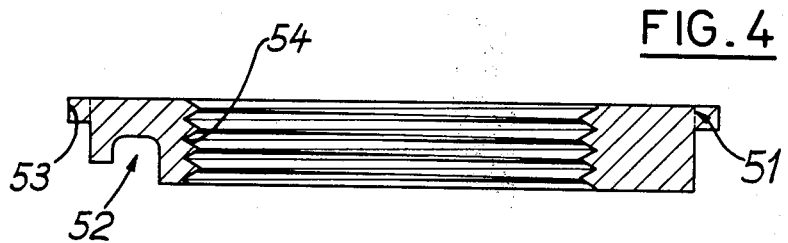
FIG. 4 is a cross-section of the nut.

FIG. 4 shows the nut 5 whose outer edge has a flange 53 provided with notches 51 for engagement with a spanner or similar tool. The face of nut 5 towards flange 11 includes a recess 52 enabling the placing of a butt 85 of a retaining tongue 84 of stopper 8. Its threading 54 is machined with a triangular section complementary to the external threads 17 of wall 13.

Figure 5:
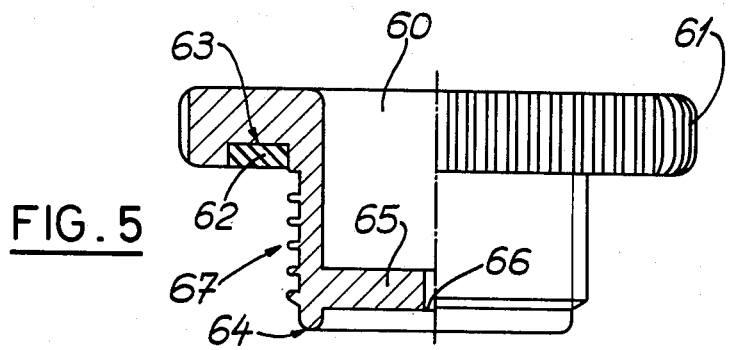
FIG. 5 is a cross-section of the sleeve.

FIG. 5 shows the sleeve 6 provided with a through bore 60 and a knurled head 61 which enables manual tightening of the sleeve in the valve body 1. In the lower part of the head 61, an annular groove 63 is provided to house joint 62 which takes up play and ensures fluid-tightness between the valve body 1 and the sleeve 6 by contact against the angular edge 16. At its end opposite the head 61, sleeve 6 includes a rounded edge 64 forming a seating against which the operculum or washer 71 comes to apply. Washer 71 has a central integral stud press-fitted in a central opening 66 in a diametral strut 65 set back from edge 64. Consequently, washer 71 fixed at its centre undergoes a pre-stressing forcing its periphery to permanently apply against the edge 64 in a manner to ensure fluid-tightness even at low pressures. Securing of the operculum or washer in orifice 66 may alternatively be provided by a screw, or by other forms of clip rod with a retaining head, possibly molded in one piece with the washer.

The stopper 8 (FIG. 1) in an elastic material such as rubber includes a hollow central stud or shank 81 of with a bulging convex outer shape to facilitate introduction into bore 60 of sleeve 6, and a dome 82 covering the parts of the valve assembly outside the inflatable envelope. The inner edge 83 of the periphery of the dome forms an inwardly directed flexible lip or toric sleeve engaging with a clip-fit under the edge of the flange 53 of nut 5. An outwardly-protruding retaining tongue 84 of the stopper molded integrally with the stopper has at its end a butt 85 which engages under the lock nut 5 in recess 52. An outwardly-protruding gripping tab 86 is also molded integrally with the stopper and is disposed opposite tongue 84 to facilitate removal of the stopper, for example for inflation of the envelope.

What is claimed is:

1. A valve assembly for inflatable envelopes and the like, comprising a valve body having an enlarged head and an externally screw threaded shank with a through bore, a nut threadably engaged on said shank and adapted to grip the wall of an envelope between the nut and said head of the valve body with a sealing elastic eyelet disposed between said head of the valve body and said wall, a valve-carrying sleeve mounted within said bore of the valve body with a sealing joint disposed between said sleeve and the valve body, a valve-forming resilient washer mounted within said sleeve and stressed against a seating on said sleeve, and a stopper covering said sleeve and said nut, the stopper including a resiliently deformable central stud sealably press-fitted in said sleeve and a peripheral part fitted about said nut.

2. A valve assembly as claimed in claim 1, in which the valve body comprises means disposed within said bore towards said head for engaging with a tool introduced through said bore of the shank.

3. A valve assembly as claimed in claim 1, in which said enlarged head of the valve body is in the form of a flange having on its side facing said shank an annular groove for receiving said sealing eyelet and on its other side a plurality of grooves extending from said bore to towards the periphery of the flange.

4. A valve assembly as claimed in claim 1, in which the inner periphery of said sealing eyelet has a toric shape when undeformed and an inner diameter less than the outer diameter of said shank, the thickness of the eyelet decreasing gradually towards its outer periphery.

5. A valve assembly as claimed in claim 1, in which said sleeve and said bore of said shank have cooperating screw threads for screwing said sleeve in said bore with an axial play, said sealing joint being disposed to take up said axial play.

6. A valve assembly as claimed in claim 5, in which said sleeve has a knurled head with an annular groove receiving said sealing joint which is applied against a V-shaped bevelled ege of said shank.

7. A valve assembly as claimed in claim 6, in which said sleeve has opposite to its knurled head a rounded end forming said seating, a diametral strut set back from the rounded end, and means defining a central opening in said strut for securing said washer.

8. A valve assembly as claimed in claim 7, in which said washer has a central integral stud press-fitted in said opening of said strut, said washer when unstressed lying perpendicular to said stud, said strut being set back from said seating by an amount to permanently resiliently stress said washer.

9. A valve assembly as claimed in claim 1, in which said stopper includes at its periphery a flexible inwardly-directed lip and an integral outwardly protruding flexible tongue terminating with a butt, said butt being fitted in a recess in the face of said nut towards said head, and said nut includes an outwardly-directed flange adapted to receive said lip with a clip fit and means defining a plurality of recesses in said flange for engaging with a tool.

10. A valve as claimed in claim 9, in which said stopper is molded in an elastic material with an integral outwardly protruding tab opposite to said tongue.

11. A valve as claimed in claim 10, in which said central stud of the stopper is formed by an integral hollow sleeve with a bulging outer face.

* * * * *